Oct. 24, 1939.    G. A. GAUM    2,176,961
METHOD AND APPARATUS FOR MAKING PIPE BENDS AND THE LIKE
Filed May 21, 1938    2 Sheets-Sheet 1
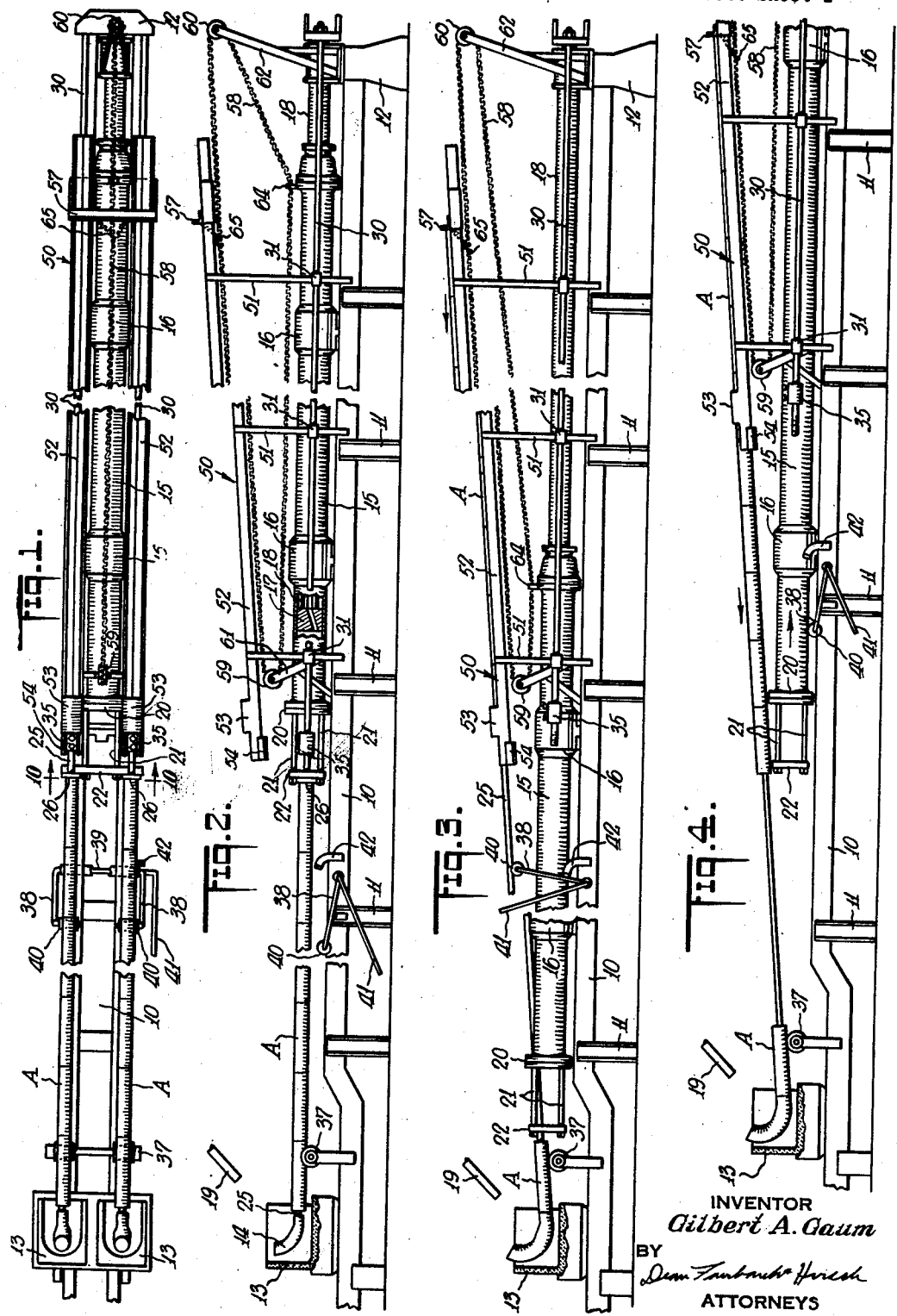
INVENTOR
Gilbert A. Gaum
BY
ATTORNEYS Oct. 24, 1939.　　　　　G. A. GAUM　　　　　2,176,961
METHOD AND APPARATUS FOR MAKING PIPE BENDS AND THE LIKE
Filed May 21, 1938　　　　2 Sheets-Sheet 2
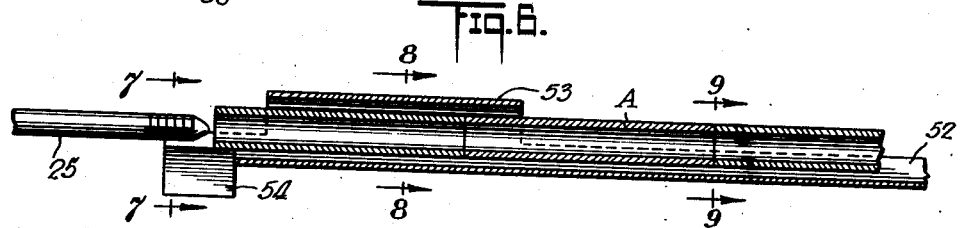
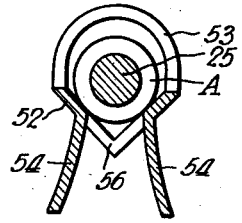
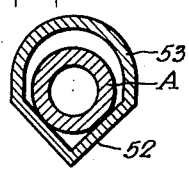
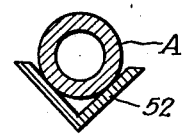
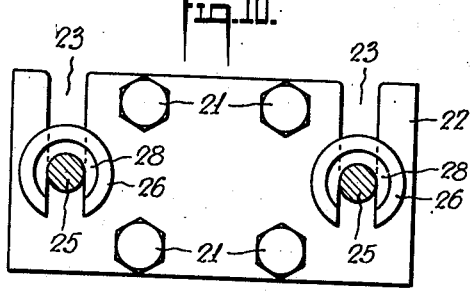
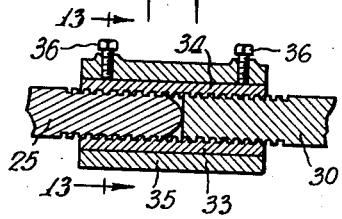
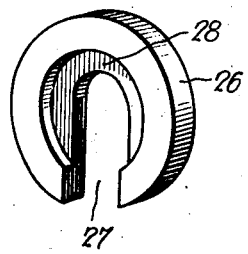
INVENTOR
*Gilbert A. Gaum*
BY
*Dean Fairbank & Hirsch*
ATTORNEYS Patented Oct. 24, 1939

2,176,961

UNITED STATES PATENT OFFICE 2,176,961

METHOD AND APPARATUS FOR MAKING PIPE BENDS AND THE LIKE

Gilbert A. Gaum, Louisville, Ky., assignor to The Girdler Corporation, Louisville, Ky., a corporation of Delaware Application May 21, 1938, Serial No. 209,177

14 Claims. (Cl. 153—48)

This invention relates to improvements in apparatus and methods for curving or expanding straight tube stock, by forcing the same endwise over an internal mandrel. In an apparatus of this general type, such as that shown in the patent to Bohling, No. 1,648,161, it is necessary to remove the mandrel from the mandrel rod to permit the tube stock or sections to be manually loaded on the mandrel rod from the delivery end. The mandrel is then secured in place, the tube stock sections are forced successively over the mandrel during the forward stroke of a reciprocal power mechanism. The manual loading and reloading of the successive batches of tubular stock on to the mandrel rod is time consuming and laborious, and has no assured correlation with the operation of the power mechanism. Furthermore, the alternate cooling and reheating of the mandrel each time the apparatus is reloaded, involves a fuel loss and a weakening effect on the mandrel.

One object of my invention is to effect a more rapid and efficient loading operation.

Another object is to automatically correlate the reloading operation, with the operation of the power mechanism.

A further object is to utilize the return movement of the power mechanism, for effecting the loading movement of the tube stock.

Another object is to provide means for effecting automatic and simultaneous reloading of a plurality of mandrel rods.

A further object is to provide improved means for supporting a batch of tube sections in position to be easily and expeditiously loaded on to a mandrel rod by a single operation.

Another object is to provide means for loading a plurality of tube sections to be shaped on to a mandrel rod by a single mechanical operation.

A further object is to provide a method and apparatus, which permits the interval between the beginning and end of the forward operating stroke of the power mechanism, to be utilized in preparing the next successive tube stock batch, in position to be loaded on to the mandrel rod by one pushing operation.

Another object is to provide an apparatus of the general type referred to, which is compact, and which occupies a minimum amount of floor space.

Various other objects, features and advantages of my invention, such as the means for easily and expeditiously lifting the detached mandrel rod into loading position, the means for guiding or centering the detached mandrel rod into loading position with respect to a loading platform, and new and improved platform construction for supporting tube sections in position, to be loaded on to a mandrel rod, will be apparent from the following particular description, and from an inspection of the accompanying drawings, in which Fig. 1 is a top plan view, somewhat diagrammatic, of the general assembly of one form of apparatus, embodying the present invention, and shown loaded and at the beginning of the shaping operation;

Fig. 2 is a side elevation, partly in section, and somewhat diagrammatic, of the structure shown in Fig. 1;

Fig. 3 is a side elevation, similar to that of Fig. 2, but showing the power mechanism after completing its forward operating stroke, and at the beginning of the loading operation;

Fig. 4 is a side elevation of the forward portion of the structure of Fig. 2, but shows an intermediate step in the loading operation while the power mechanism is on its return stroke;

Fig. 5 is a top plan view, on a somewhat larger scale, of the forward portion of the loading platform;

Fig. 6 is a longitudinal section on line 6—6 of Fig. 5;

Figs. 7, 8, and 9 are transverse sections on a still larger scale, taken on lines 7—7, 8—8, and 9—9 respectively, of Fig. 6;

Fig. 10 is a section taken on line 10—10 of Fig. 1, but shown on a larger scale;

Fig. 11 is a perspective view of a pusher ring, adapted to cooperate with the power mechanism;

Fig. 12 is a longitudinal section taken through the coupling means between the rear end of the mandrel rod and a fixed support; and Fig. 13 is a section taken on line 13—13 of Fig. 12.

In the specific apparatus illustrated, an elongated press bed 10 is supported by a plurality of standards 11, and provides a supporting track upon which the power mechanism may be mounted for moving the tube sections A over the shaped mandrels which may be of the type shown in the Bohling Patent 1,353,714. At the rear end of the press bed 10 is a fixed support 12, serving as an anchoring means for the mandrel rods and plunger rod, later to be described. If desired, the opposite end of the press bed may be so arranged, as to afford a track or guide means for a hood or oven structure 13 so that the latter may be conveniently adjusted in respect to the die mandrels 14. Any suitable heating means such as gas jets 19 may be positioned adjacent to said ovens, to heat said mandrels, and the tube sections, as they are forced over said mandrels.

The power mechanism may be of the general type shown in the Bohling Patent No. 1,648,161 and acts to force the tube stock over the die mandrels 14. As shown, it includes a cylinder 15, having supports 16 permitting endwise movement along the press bed 10. Within the cylinder is a stationary piston 17 (Fig. 2), from which extends a stationary hollow plunger rod 18, rigidly fastened at its rear end to the support 12. Any suitable arrangement of conduits or passages may be employed for delivering a pressure fluid into and from spaces within the movable cylinder 15, upon the opposite side of the stationary piston 17, so as to force said cylinder endwise in either direction. As shown, these passages are through the rod 18 and the piston.

The forward working end of the cylinder 15 is completely closed by a pressure tight head 20, which has bracket carrying rods 21 secured to a pusher plate 22. A suitable form of pusher plate (Fig. 10) has a pair of open parallel slots 23, extending down from the top edge of said plate, to receive a pair of mandrel rods 25. As the purpose of the plate 22 is primarily to force the tubular stock along the mandrel rods 25, and over the mandrels 14, it is obvious that numerous variations in the size and shape of the plate, as well as the location and number of the mandrel rod slots 23 therein will be employed, without departing from the teaching of the invention. The plate may be much wider and receive four, six, or more of such rods.

In order to minimize wear of the plate 22, and to effectively and firmly receive the rear end of the rearmost tube section A during shaping operations, there may be employed pusher rings 26 (Fig. 11) each provided with an open-ended slot 27, by which said rings may be made to straddle their respective mandrel rods 25 (Fig. 10) and having a circular recess 28 on its outer face, concentric with the curved base of said slot, for freely receiving the end of a tube section A. These pusher rings 26 are manually slipped over the respective mandrel rods 25 between the pusher plate 22 and the rearmost tube sections A on said rods, at the end of the return stroke of the cylinder 15, and are manually removed after the conclusion of the forward power stroke of said cylinder.

Securely fastened to the support 12 in any suitable manner, are a plurality of stress or tie rods 30, extending forwardly parallel to the path of movement of the cylinder 15, and supported intermediate their ends on suitable brackets 31 fixed to the press bed 10. While two of such rods 30 are shown, it is obvious that a single rod or any number of rods may be so employed, corresponding to the number of mandrels. At their forward ends, the tie rods 30 are detachably secured to the mandrel rods 25 to prevent endwise movement of the mandrel rods during the forcing of the tubes over the mandrels. As shown in Figs. 12 and 13, the rear end of each mandrel rod 25, and the forward end of the corresponding tie rod 30, are threaded or grooved in any suitable manner to receive a split coupling having a lower part 33 and an upper part 34 which may be held together within an outer collar 35. This may be locked in place by set screws 36. By merely loosening these screws 36, and sliding the collar 35 endwise, the part 34 may be removed and the two rods 25 and 30 separated by lifting the rod 25 into loading position.

The location of the coupling means would normally be shortly beyond the piston 17, and a short distance to the rear of the pusher plate 22, when the cylinder 15 is in the fully retracted position, shown in Figs. 1 and 2.

The mandrel rods 25 extend forwardly from the coupling means, and are supported intermediate of their ends within slots 23 in the pusher plate 22, and upon supporting structures 37, having rollers adapted to embrace, guide and support the tube stock A, as it is slid along said rods by said pusher plate. These mandrel rods 25 at their forward ends are fixed to the mandrels 14, and are of somewhat greater length than the displacement stroke of the cylinder 15, so that one tube section A will always remain on each mandrel rod in engagement with its corresponding supporting structure 37, as shown in Fig. 3.

When it is desired to load a mandrel rod 25 from the rear end, the said end is uncoupled from its corresponding tie rod 30, as previously indicated, and swung upwardly at a slight angle, with the roller support 37 as a fulcrum.

In order to raise the disconnected mandrel rods 25 quickly and accurately into proper loading position, any suitable lifting means may be provided. Merely for illustrative purposes, I have shown a lever mechanism, comprising a pair of lifting arms 38, which are joined at one end by a cross rod 39, rotatably supported in suitable bearings on the press bed 10, and which carry rotatable rollers 40 at their free ends, as shown in Figs. 1 to 4. Connected to one end of the cross rod 39 is an operating handle 41, by which the lifting arms 38 may be swung about their pivotal support to bring the rollers 40 into engagement with the detached mandrel rods 25, and to angularly lift the latter about the supports 37, until one of said arms reaches a stop 42. In this position of the lifting mechanism, the mandrel rods 25 will be inclined in proper loading position, shown in Fig. 3.

As an important feature of the present invention, there is provided an elevated loading platform 50, supported in any suitable way above the power mechanism, as for instance by standards 51 connected to the brackets 31, and which is preferably inclined at about the same angle as the detached mandrel rods 25 when the latter are raised to loading positions, as shown in Figs. 3, 5 and 6. This platform 50 includes runways 52, corresponding in number to the mandrel rods 25. Two of such parallel runways 52 are shown, each in the form of a V-shaped trough, receiving the tube sections A in end to end relationship. If desired, the side walls of the troughs may be provided with friction reducing rollers, similar to those used in conveyor systems, to facilitate movement of the tube sections along said troughs. Each runway or guide trough near the forward end thereof may be provided with a roof or hood 53 to prevent the tubes A from buckling or kicking up as they are pushed along.

The extreme forward end of each runway 52 is provided with means for guiding the rear end of the corresponding detached mandrel rod 25 as it is lifted into loading position. This is shown as a pair of downwardly diverging flanges 54 (Fig. 7) on opposite sides of a restricted throat 56, of a width slightly greater than the diameter of the mandrel rod 25, so that as said rod is tilted upwardly into loading position, the flanges 54 will center the rear end of said rod horizontally, and when said end reaches the position shown in Fig. 6, it will be in position to receive the tubes A.

Sliding along the two runways 52 is a pusher plate 57, for moving the tubular stock along said runways and onto and along the mandrel rods 25 to load the latter. In order to correlate the forward loading movement of this pusher plate 57 with the return movement of the cylinder 15, and to force the tubes onto the mandrel rods, there is provided an endless chain 58 passing over pulleys 59 and 60, suitably supported on fixed brackets 61 and 62 respectively. The lower run of the cable 58 is secured to the rear end of the cylinder 15 at 64, and the pusher plate 57 is provided with suitable means 65, for detachably connecting said plate to the upper run of said cable. This may be a short chain and a hook for catching into a link of the chain. At the completion of the loading operation, the clamping means 65 may be disengaged from the cable 58 to permit the shifting of the pusher plate 57 manually or by other means to the rear of the loading platform 50, so that the runways may be reloaded at any time during the forward movement of the cylinder.

It is thought that the sequence of operation will be apparent, but may be briefly summarized as follows:

At the beginning of the operating stroke of the cylinder 15 (Figs. 1 and 2), the loaded mandrel rods 25 will be coupled to their respective tie rods 30, the pusher plate 57 will be near the rear end of the loading platform 50, and the pusher rings 26 will be straddled between the plate 22 and the rearmost tubes on said mandrel rods. The motive fluid flow is then started to move the cylinder 15 to the left, and to cause the tube sections A to be forced successively over the mandrels 14, until said cylinder reaches the end of its forward operating stroke. During this forward movement of the cylinder 15, the operator may place the next load of tube sections on the platform 50.

At the completion of the forward operating stroke, the pusher rings 26 are removed, the mandrel rods 25 are disconnected from the tie rods 30, and tilted about the roller supports 37 into loading position (Fig. 3). It will be obvious that if the supports 37 be further to the right from the position shown in the drawings or if the mandrel rods be lifted to a steeper angle, the mandrel or the tube portion thereon will engage with the bottom of the heating chamber which latter will thus serve as the fulcrum support.

The pusher plate 57 is connected to the top run of the cable 58 by the member 65 and the motive fluid is admitted to move the cylinder 15 and the pusher plate 22 rearwardly. This causes the moveemnt of the upper run of the cable 58 to the left. The pusher plate connected to the upper run of the cable moves the tube sections down the reloading platform 50 and onto the mandrel rods 25, as shown in Fig. 4. As the tube sections A are moved along the mandrel rods 25 to the left, the pusher plate 22 which is connected to the lower run of the cable will move to the right. The operation is continued until the last of said tube sections is clear of the plate 22, as shown in Fig. 4.

The lifting mechanism for the mandrel rods 25 may be manually shifted to the position shown in Fig. 4 after the first of the tube sections on the platform 50 have passed over said rods, so as not to interfere with the loading of said rods, or may be shifted in this position automatically by the movement of the leading tube sections on said rod as they reach the rollers 40 of said mechanism. The tube sections on the forward end of the platform 50 encircling the rear ends of the mandrel rods 25 will serve with the runways 52 to support the mandrel rods 25 in tilted position, when the lifting mechanism is in inoperative position.

At the end of the return movement of the cylinder 15, the mandrel rods 25 will be fully loaded and may be reconnected to the tie rod 31, as already described, for the next shaping operation.

The process and apparatus of the present invention avoid the disadvantages of delay, mandrel heat losses, and excessive labor requirement attending prior processes and apparatus, in which the tubular stock is loaded upon the mandrel rod from the mandrel end after the heated mandrel has been removed. By means of the present invention, the mandrel rods 25 are simultaneously and fully loaded automatically during the return stroke of the cylinder 15 so that no time is lost. Any conventional quick return of the cylinder 15 may be employed, for example, by the more rapid delivery of pressure fluid to the rear side of the piston 17, and thus I am able to reduce to an appreciable extent, the amount of time formerly taken up by the independent actions of the cylinder return, and the later manual loading of the mandrel rods 25.

Although in the form of apparatus shown, the platform 50 is disposed above the cylinder 15, as far as certain aspects of the invention are concerned, this platform may be disposed alongside of said cylinder, and the slots 23 of the pusher plate 22, made to extend transversely to permit the mandrel rods 25 to be displaced in a corresponding direction into loading position with respect to said platform.

Having thus described my invention, what I claim as new and desire to secure by Letters Patent is:

1. A machine for shaping tube sections including a mandrel rod having a die mandrel at one end thereof, means for detachably holding the other end against lengthwise movement, means for forcing tube sections along the mandrel rod and successively over said die mandrel, a loading platform adapted to support a plurality of tube sections in aligned end to end relationship, and means for supporting the mandrel rod in substantially longitudinal alignment with the tube sections on said platform, and in loading position to receive said latter sections for the next shaping operation.

2. A machine for shaping tube sections including a mandrel rod having a die mandrel at one end thereof, and having the opposite end movable laterally to operating or to loading positions, reciprocable means for forcing tube sections along the mandrel rod, and successively over said die mandrel when the rod is in operating position, and a loading platform abreast of said reciprocable means, and adapted to support a plurality of tube sections in aligned end to end relationship, whereby they may be moved simultaneously along said platform by one pushing operation onto said rod when the latter is swung to loading position.

3. A machine for shaping tube sections including a mandrel rod having a die mandrel at one end thereof, means for detachably holding the other end, reciprocable means for forcing tube sections along said mandrel rod and successively over said die mandrel and while said rod is held against endwise movement, an elevated inclined loading platform above said reciprocable means adapted to support a plurality of tube sections in aligned end to end relationship, and a fulcrum support for said rod whereby the rod when detached from said holding means may be tilted into longitudinally aligned loading position with the tube sections on said platform.

4. A machine for shaping tube sections including a mandrel rod having a die mandrel at one end thereof, means for detachably holding the other end, reciprocable means for forcing tube sections along said mandrel rod and successively over said die mandrel and while said rod is held against longitudinal movement, an elevated loading trough above said reciprocable means, adapted to support a plurality of tube sections in aligned end to end relationship, a fulcrum support for said rod whereby the rod when detached from said holding means may be tilted into longitudinally aligned loading position with the tube sections on said trough, and guide means at the forward end of said trough for centering the detached rod with respect to said latter tube sections, while said rod is being tilted in loading position.

5. A machine for shaping a plurality of tube sections simultaneously including a plurality of substantially parallel mandrel rods, each having a die mandrel at one end thereof, means for detachably holding said rods against endwise movement, reciprocal power means for forcing tube sections along the mandrel rods, and over said die mandrels during the power stroke of said power means, a plurality of substantially parallel loading runways, corresponding in number to the number of mandrel rods, and disposed above said reciprocable means, each of said runways being adapted to support a plurality of aligned tube sections, said mandrel rods being tiltable into substantially longitudinal alignment with the respective rows of tube sections on said runways, and a pusher plate extending across said runways, and adapted to engage the rearmost tube sections of each row, to simultaneously move said tube sections along said runways, and on to said mandrel rods.

6. A machine for shaping tube sections including a mandrel rod having a die mandrel at one end thereof, means for detachably holding the other end, power means for forcing tube sections along the secured mandrel rod, and successively over said die mandrel, an elevated loading platform above said power means, adapted to support a plurality of tube sections in aligned end to end relationship, a fulcrum support for said rod, and means for lifting the detached end of the mandrel rod about said support, and into loading position with respect to said platform.

7. A machine for shaping tube sections including a mandrel rod having a die mandrel at one end, a detachable securing means at the other end, reciprocable means movable in one direction for forcing tube sections along the connected mandrel rod, and successively over the die mandrel, and movable in the opposite direction for loading tube sections onto the rear end of the rod when the latter is detached from said securing means.

8. A machine for shaping tube sections including a mandrel rod having a die mandrel at one end, a detachable securing means at the other end, a reciprocable power mechanism, means responsive to the movement of said means in one direction for forcing tube sections along the connected mandrel rod and successively over the die mandrel, and means responsive to the return movement of said mechanism, for loading tube sections on the rod for subsequent tube shaping operations, when the latter is released from said securing means.

9. A machine for shaping tube sections including a mandrel rod, a reciprocable mechanism, means carried by said mechanism for forcing the tube sections along said mandrel rod during the forward stroke of said mechanism, and a tube pushing mechanism, actuated by said mechanism during its return stroke, for loading a longitudinal row of tube sections on said rod.

10. A machine for shaping tube sections including a mandrel rod, a reciprocable mechanism for forcing the tube sections along said mandrel rod during the working stroke of said mechanism, and means for loading a charge of tube sections onto said rod during return movement of said mechanism.

11. A machine for shaping tube sections including a fixed structure, a mandrel rod having a die mandrel at one end, detachable connections between said structure and the other end of said rod, reciprocable power means for forcing tube sections along the mandrel rod and successively over said die mandrel during the working stroke of said means while said rod is connected to said structure, a loading platform adapted to support a plurality of aligned tube sections, means for supporting the mandrel rod when detached from said structure and in substantial longitudinal alignment with the tube sections on said platform, and means driven by said power means during the return movement of the latter for moving said tube sections onto said rod.

12. A machine for shaping tube sections including a mandrel rod having a die mandrel at one end, power means including a reciprocable cylinder and a stationary piston, a member connected to said cylinder for forcing tube sections along said rod, and successively over said die mandrel during the working stroke of said means, a support for a plurality of aligned tube sections, said mandrel rod being movable into substantial alignment with the tube sections on said support, and a pusher member connected to said cylinder and adapted to engage the rearmost one of the tube sections on said support, to move said sections along said support and onto said rod during the return movement of said cylinder.

13. In the art of manufacturing bent pipes from tubular stock forced over a stationary mandrel having a supporting rod, said method comprising loading a platform with the tube sections end to end during the working stroke of said power means, disconnecting the stationary rod from retaining means at a point substantially removed from said mandrel and at the end of said working stroke, moving the disconnected rod about a fulcrum support and in loading position with respect to said platform, and sliding the aligned tube sections along said platform and onto said rod during the return movement of said power means.

14. In the art of manufacturing bent pipes from tubular stock forced along a stationary rod by reciprocable power means and over a stationary mandrel carried by said rod, the method comprising loading a platform with the tube sections end to end during the working stroke of said power means, disconnecting the stationary rod from retaining means at a point substantially removed from said mandrel and at the end of said working stroke, moving the disconnected rod about a fulcrum support and into loading position with respect to said platform, and sliding the tube sections along said platform and onto said rod during the return movement of said power means and at a rate corresponding to the rate of speed of said power means during said latter movement.

GILBERT A. GAUM.